(12) United States Patent  
Buxton (10) Patent No.: US 7,454,123 B2  
(45) Date of Patent: Nov. 18, 2008

(54) PERSONAL VIDEO RECORDER HAVING REDUCED OVERSCAN CODING

(75) Inventor: Mark J. Buxton, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1258 days.

(21) Appl. No.: 10/165,524

(22) Filed: Jun. 6, 2002

(65) Prior Publication Data

US 2003/0228127 A1  Dec. 11, 2003

(51) Int. Cl.
*H04N 7/26* (2006.01)

(52) U.S. Cl. .................................. 386/109; 386/124

(58) Field of Classification Search ............... 386/27, 386/33, 37, 40, 46, 52, 68, 109, 111, 112, 386/123, 124, 129, 131; 375/240.24, 240.27, 375/240.29; 348/241
See application file for complete search history.

(56) References Cited

U.S. PATENT DOCUMENTS

| | | | | |
|---|---|---|---|---|
| 4,028,726 A | * | 6/1977 | Argy ........................... 348/637 |
| 5,444,798 A | * | 8/1995 | Enomoto et al. ............. 382/199 |
| 5,583,936 A | * | 12/1996 | Wonfor et al. ............... 380/204 |
| 5,666,165 A | * | 9/1997 | Izawa et al. .................. 348/445 |
| 5,734,743 A | * | 3/1998 | Matsugu et al. .............. 382/154 |
| 6,011,901 A | * | 1/2000 | Kirsten ........................ 386/123 |
| 6,043,838 A | * | 3/2000 | Chen ............................ 348/42 |
| 6,463,102 B1 | * | 10/2002 | Linzer .................... 375/240.29 |

OTHER PUBLICATIONS

U.S. Appl. No. 10/116,521, Williams et al.

* cited by examiner

*Primary Examiner*—Thai Tran  
*Assistant Examiner*—Mishawn Dunn  
(74) *Attorney, Agent, or Firm*—Marger Johnson & McCollom, P.C.

(57) ABSTRACT

A digital recording device for storing video data is disclosed. The digital recorder intelligently records less data than is provided to it by determining which data to record, and which data to eliminate. In some embodiments, the recorder drops or modifies overscan data from a video frame prior to compressing the data, thereby relieving a data encoder from unnecessary data operations, and saving storage space.

32 Claims, 7 Drawing Sheets

| B1 | B8 | B15 | B22 | B29 |
|---|---|---|---|---|
| B2 | B9 | B16 | B23 | B30 |
| B3 | B10 | B17 | B24 | B31 |
| B4 | B11 | B18 | B25 | B32 |
| B5 | B12 | B19 | B26 | B33 |
| B6 | B13 | B20 | B27 | B34 |
| B7 | B14 | B21 | B28 | B35 |

PERSONAL VIDEO RECORDER HAVING REDUCED OVERSCAN CODING

TECHNICAL FIELD

This disclosure relates to personal video recording systems and, more particularly, to a personal video recording system that can record less than the full amount of a video signal provided to it.

BACKGROUND

Personal video recording devices (PVRs) are becoming more commonplace in society. Like Video Cassette Recorders (VCRs), PVRs store video signals for later retrieval and reproduction, thereby allowing users to record a program that is broadcast at one time and view it at another time (time shifting). However, PVRs differ from VCRs in many ways.

One major difference is that, whereas VCRs store video signals on inexpensive magnetic tapes, PVRs store encoded video signals on a magnetic hard disk or hard drive. When a user wishes to watch a previously stored video program, the encoded data is retrieved from the hard drive, decoded, and then rendered on a television (TV) or monitor.

One set of problems with current PVRs revolve around storing the data on the hard drive. Unlike VCRs, where inexpensive tapes used to store the programs are easily removable, the hard drive is, to the typical user, permanently fixed within the PVR. The hard drive has a finite storage capacity, and therefore so too does the PVR. Once the hard drive is filled with data, no additional data can be stored until some of the data on the drive is deleted. Present PVRs lack any mechanism to easily transmit the data outside of the system, such as to a tape or removable disk. Therefore, data deleted from the hard drive is permanently lost, unless the data is re-captured from a different broadcast and again stored on the hard drive.

As PVRs evolve, users would like to see additional capability and functionality in their systems. For instance, a PVR that included multiple input data channels could record multiple channels of programming at the same time. Additionally, quality of the reproduced video could be enhanced if more data could be stored on the hard drive. There are ever increasing demands for storing more data at a faster rate with higher quality on a PVR.

Presently, data throughput of the hard drive is one of the system parameters that is most strongly considered when designing a PVR. The hard drive of the PVR has a finite input/output (throughput) bandwidth. If the throughput bandwidth could be raised, the amount of data simultaneously stored on the hard drive could be increased, and the quality of the compressed image data stored on the hard drive could be improved. Unfortunately, the throughput capacity of hard drives is fixed by hardware constraints of the drives themselves, and cannot be easily modified above their current maximum.

Embodiments of the invention address these and other deficiencies.

BRIEF DESCRIPTION OF THE DRAWINGS

The description may be best understood by reading the disclosure with reference to the drawings, wherein.

DETAILED DESCRIPTION

Figure 1:
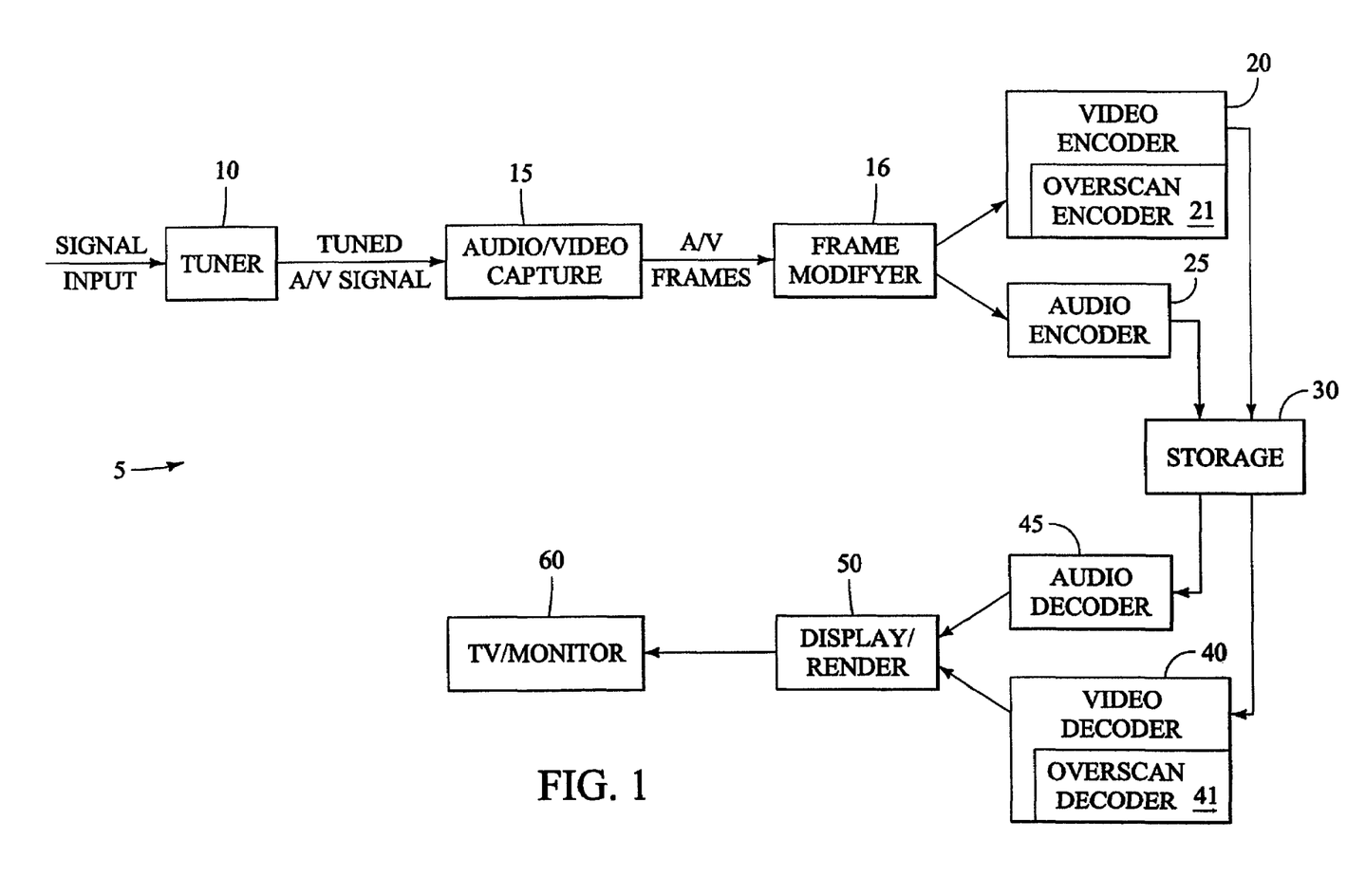
FIG. 1 is a functional block diagram of a Personal Video Recorder system according to embodiments of the invention.

FIG. 1 shows a functional block diagram of a PVR system 5, according to embodiments of the invention. The PVR system 5 includes a tuner 10 that provides a tuned video/audio signal, such as a channel of broadcast, cable, or satellite television. An analog to digital converter (not shown) is present in either the tuner 10 or a capture device 15, and is used to convert the analog video and audio signals into a stream of digital data signals.

The capture device 15 accepts the data stream from the tuner 10 and breaks the data stream into manageable chunks of data. The data chunks are oftentimes sized to include one or two fields. In TV displays, generally, two fields make up a single frame or image, which is updated between 24 and 60 times per second. On TVs, the two fields are typically shown in an interlaced format, with each field displaying on every other line of a screen of a TV. When superimposed, the two fields create the complete image frame. Computer monitors, conversely, generally display the two fields in a non-interlaced format, where the fields are combined in a frame prior to being shown, and the frame shown at one time. In describing embodiments of the invention, data groupings will be referred to as "frames", although embodiments are able to work equally as well with either frames or fields as the group of data output by the capture device 15.

The captured frames are passed from the capture device 15 to a video encoder 20, such as an MPEG (Moving Picture Experts Group) encoder. Other types of encoders are possible, such as MJPEG (Moving Joint Photographics Expert Group), and those using streaming formats such as REAL MEDIA, WINDOWS MEDIA, or QUICKTIME. Embodiments of the invention are able to work with any of these formats, and others. Audio data corresponding to the video frames are passed to an audio encoder 25 that operates in conjunction with the selected video encoder format. After encoding, the encoded video and audio signals are stored on a storage device 30. Typically a computer hard drive serves as the storage device 30, because a hard drive provides a relatively inexpensive and efficient way to store large amounts of digital data.

To view the stored video data, first the data is retrieved from the storage device 30 and passed to a set of video and audio decoders 40, 45 which use the retrieved data to re-create the desired image fields or frames. Of course, the video and audio decoders 40, 45 are matched so that they can decode whatever format was used for the video and audio encoding. The re-created frames are then sent to a rendering device 50 for display and playback on a TV or monitor 60. Such a PVR system 5 allows the user to record programs, store them on the hard drive 30, and play them back at the user's direction.

The PVR system 5 of FIG. 1 differs from standard PVRs, however, in that it can modify the video signal between the time it is received from the tuner 10 and the time it is rendered on a TV or monitor 60. Plus, this modification can be performed so that the modification is completely or nearly completely unnoticeable to a viewer of the re-created image. Specifically, embodiments of the invention capture, encode, decode, and/or render less than a full frame of image data. By processing less than all of the data sent to the PVR system 5, embodiments of the invention are able to store more data, and store it faster, than other PVRs not so configured, without causing a degradation in picture quality.

These embodiments process less than the entire amount of data by deleting, manipulating or otherwise treating data contained in an overscan region of the image frame differently than data contained in the central, or non-overscan region. The overscan region of an image frame makes up the outermost portions of the image frame, as described with reference to FIG. 2.

Figure 2:
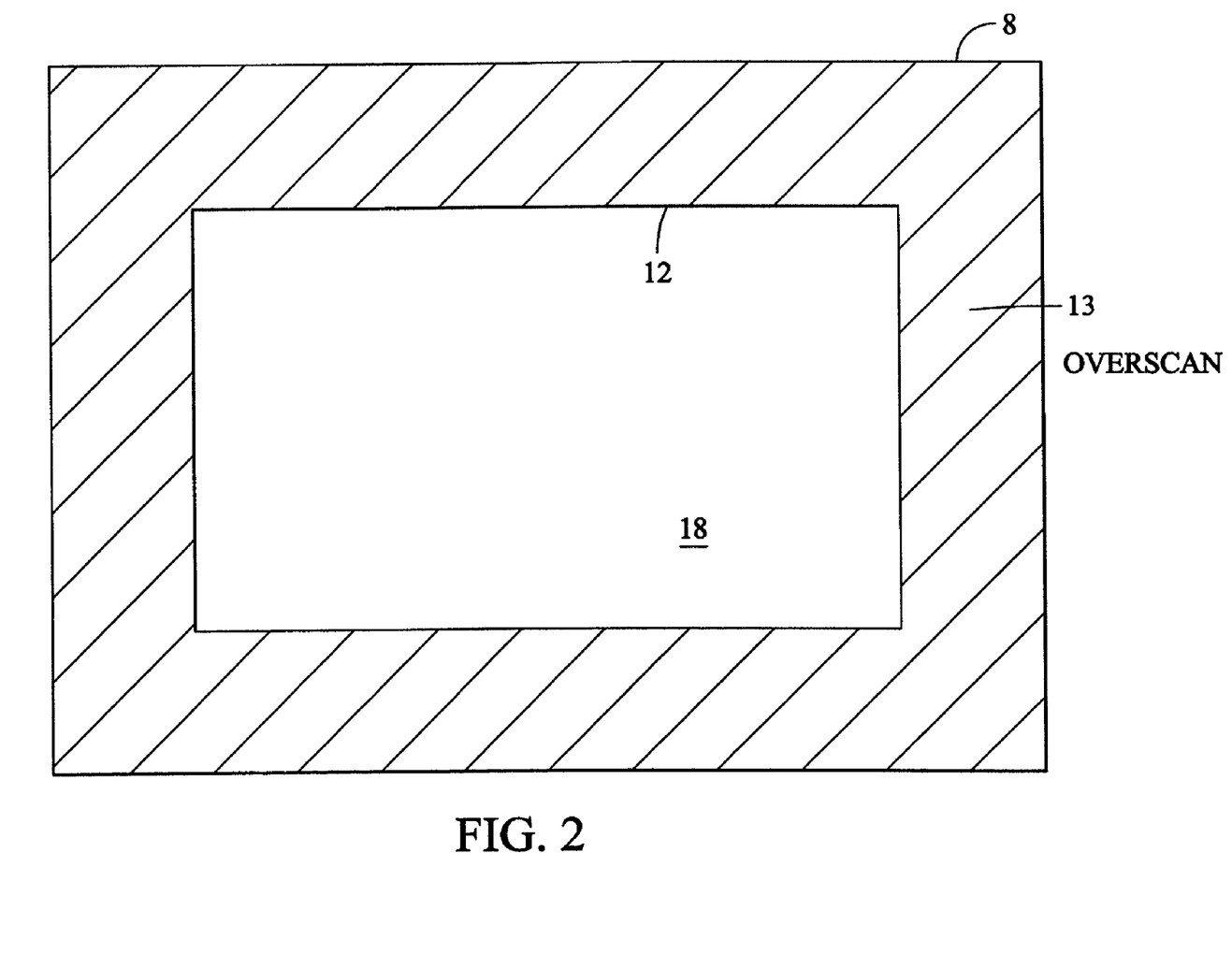
FIG. 2 is a diagram of video frame including overscan areas.

FIG. 2 shows a full image frame 8 and a smaller image frame 12 that is roughly 95% the size of the frame 8. The image frame 8 is the entire frame that would be output from a standard capture device. In nearly every consumer TV, only a central image area 18, bounded by the smaller image frame 12 is actually displayed to a viewer, and not the full image frame 8. In other words, an overscan area 13, located between the image frames 8 and 12, is typically not visible to the TV viewers.

Frames 8 can be of any size, but there are some typical or standard sizes used in industry. For instance, the outermost portion of the frame 8 may have a size of 352 pixels in height and 480 pixels in width. This is commonly referred to as 352×480. Other standard sizes include 480×480, 512×480 and 640×480. It is common to characterize the size of a frame in discrete pixel sizes, even though the actual signal input into the tuner 10 of the PVR system 5 (FIG. 1) is analog, and the output display 60 is typically an analog TV. Oftentimes, the resolution of a TV is stated as lines of resolution, such as 525 or 480, but the pixel size of the frame need not, and probably will not, necessarily match the TV resolution.

Returning back to FIG. 2, although the overscan area 13 is not displayed by a TV, the data making up the overscan area is generally still broadcast or otherwise delivered to the TV. Showing only the non-overscan regions, or central image area 18 can be thought of as similar to "cropping" edges of a photograph or placing a mat around a picture. The amount of cropping or overscan varies from one TV to another, but generally at least 5% and possibly up to 15% of the original image frame input to the TV is omitted from the image shown on the TV screen.

One reason for TVs having any amount of overscan is that early consumers of televisions did not want to "waste" any of the area of their expensive TV screens, and demanded that the image take up the entire TV screen area. Because the extreme edges of early TV screens produced poor images, manufacturers internally cropped the edges of the phosphor screen in TVs by placing an opaque material over the edges, or by using other methods. Although early TVs produced the entire original signal, the edges were physically blocked from the TV viewer, and viewers only saw the central image area 18.

Broadcasters eventually realized that they were sending portions of images, i.e., the overscan regions 13, which were never seen by anyone, and, began using the overscan region for other purposes. Presently the overscan region 13 may be used to carry no data, or simple noise data, or even useful information as a "data channel." For example, Actimates toys use the left-most pixel of the overscan region 13 as a data channel to send data that allows their toys to "interact" with the TV. Similarly, closed captioning in the USA is carried in one of the vertical lines in the overscan region 13.

Typical PVRs capture, encode, store, and decode the entire image frame 8 (FIG. 2) presented to the PVR, while embodiments of the invention minimize processing and storage by treating data in the overscan region 13 of the video signals differently than data in the central image area 18 of the frame 8. In some embodiments, the overscan region 13 is simply not captured, encoded, stored or decoded. Other embodiments may capture the overscan region 13, but modify the encoding such that the overscan regions are not coded or stored on the hard drive 30. Or, the overscan region 13 itself may be modified, such as by changing it to all black pixels prior to encoding. This allows the encoding to proceed much faster than if the original overscan 13 data was also coded. Still other embodiments modify both the coder and decoder to minimize overscan coding and decoding.

The following discussion provides details on how the PVR system 5 of FIG. 1 processes incoming video signals differently than other PVR 5 systems. Some embodiments of the inventive PVR system 5 include a frame modifier 16 located between the capture device 15 and the video encoder 20. The frame modifier 16 is used to delete portions of or the entire overscan area 13 of a video data frame 8. In one of the easiest to implement modes of operation, the frame modifier 16 may simply strip data from one or both of the top and bottom margins of the overscan area 13 of the original image frame 8. In other embodiments, the frame modifier 16 may strip data from all of the top, bottom, left and right margins of the overscan area of the original image frame 8. This latter embodiment is more difficult to implement because the data input into the capture device 15 is typically in rasterized format, i.e. the input data is streamed as if it were a single dimension array of data, and not broken into lines or blocks of the image frame 8. This can be especially difficult if the data is presented in interlaced format, in which relative location of data within the data stream does not directly correlate to the location of the data within the image frame 8.

The frame modifier 16 strips the top and bottom lines by simply deleting the data from the beginning and end of the original image frame 8 prior to passing it to the video encoder 20. Deleting data from the left and right margins of the overscan area 13 is more difficult because the frame modifier 15 must strip some of the data from the beginning and end of each line of the image frame 8, and allow other data to pass in each line to create the central area 18 of the image frame 8.

In this embodiment, the frame modifier 16 simply deletes an amount of data, preferably between 3% and 15% prior to it ever being encoded by the video encoder 20. Because less image data is supplied to the video encoder 20, the video encoder operates on a reduced amount of data and can therefore operate faster than if it were operating on the entire standard image frame 8. The amount of data from the overscan region 13 discarded or modified by the frame modifier 16 can be determined when the PVR system 5 is designed or implemented. If more data is discarded, the video encoder 20 may operate faster but a viewer may be able to detect that some data of the image is missing. If less data is discarded, the viewer will not detect any missing data, but the savings in encoding time will not be as great.

In implementation the frame modifier 16 may be a standalone component or run in firmware or could even be a software process running on a dedicated or general purpose processor. Additionally, the frame modifier 16 may be implemented as part of the capture device 15, or even as part of the video encoder 20.

Figure 3:
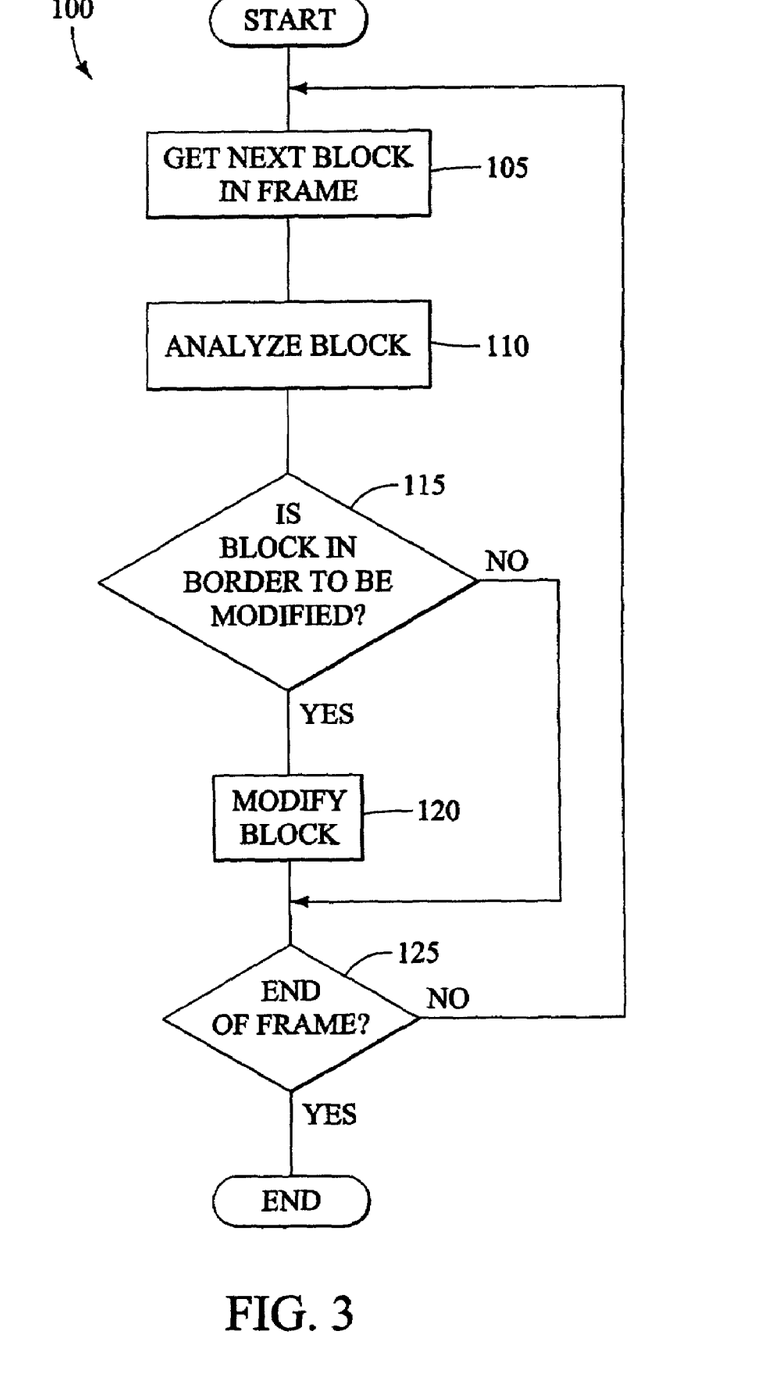
FIG. 3 is an example flow diagram showing processes perform by the Personal Video Recorder of FIG. 1.

FIG. 3 is an example flow diagram showing processing that can occur in the frame modifier 16. A flow 100 begins at a process 105 where a next block of a current frame is examined. The frame modifier 16 may operate with single lines of image data, but it is more convenient for groups of pixels to be processed in blocks of adjacent pixels, as is known in the art. In MPEG encoding, macroblocks are formed by groups of 16 horizontal pixels and 32 vertical pixels. In embodiments of the invention, the overscan region 13 is chosen to be sized so that it is made of many complete blocks, i.e., a particular block of the frame 8 is either entirely inside or outside the overscan region.

Figure 4:
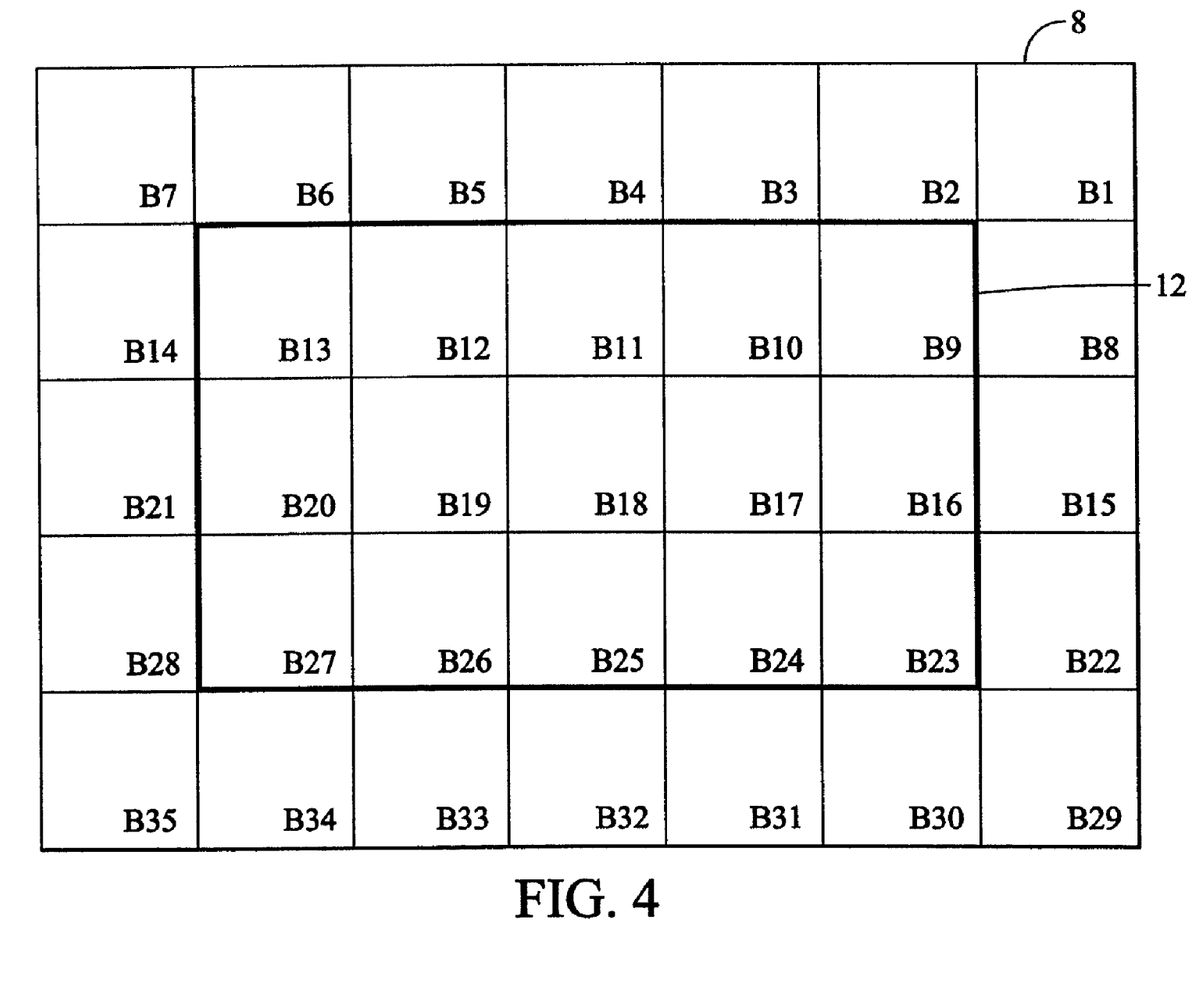
FIG. 4 is a diagram showing how blocks are arranged within an image frame.

For instance, shown in FIG. 4 is a sample image frame 8 made from 35 macroblocks B1-B35. The central image area 18, which is bound by the smaller frame 12, includes only blocks B9-B13, B16-B20, and B23-B27. The image frame 8 of FIG. 4 is only illustrative and typically an image frame would be made out of many more macroblocks than 35, and the ratio of the number of macroblocks in the central image area 18 to the number of macroblocks in the entire image frame 8 would be much greater than that shown in FIG. 4. It is also possible to operate the frame modifier 16 and/or other components of the PVR system 5 in other mode where only a partial block is within the overscan region 13, but more processing is required, however.

Returning back to FIG. 3, process 110 analyzes the acquired block, and a check 115 determines if the block is in the border to be modified. If yes, then the block is modified in a process 120, such as by being deleted or otherwise modified as described below. If the block is not in the border, it is left alone. A check 125 is performed to see if there are more blocks in the frame. If so, the flow 100 repeats until all of the blocks in the entire image frame 8 has been analyzed.

Figure 5A:
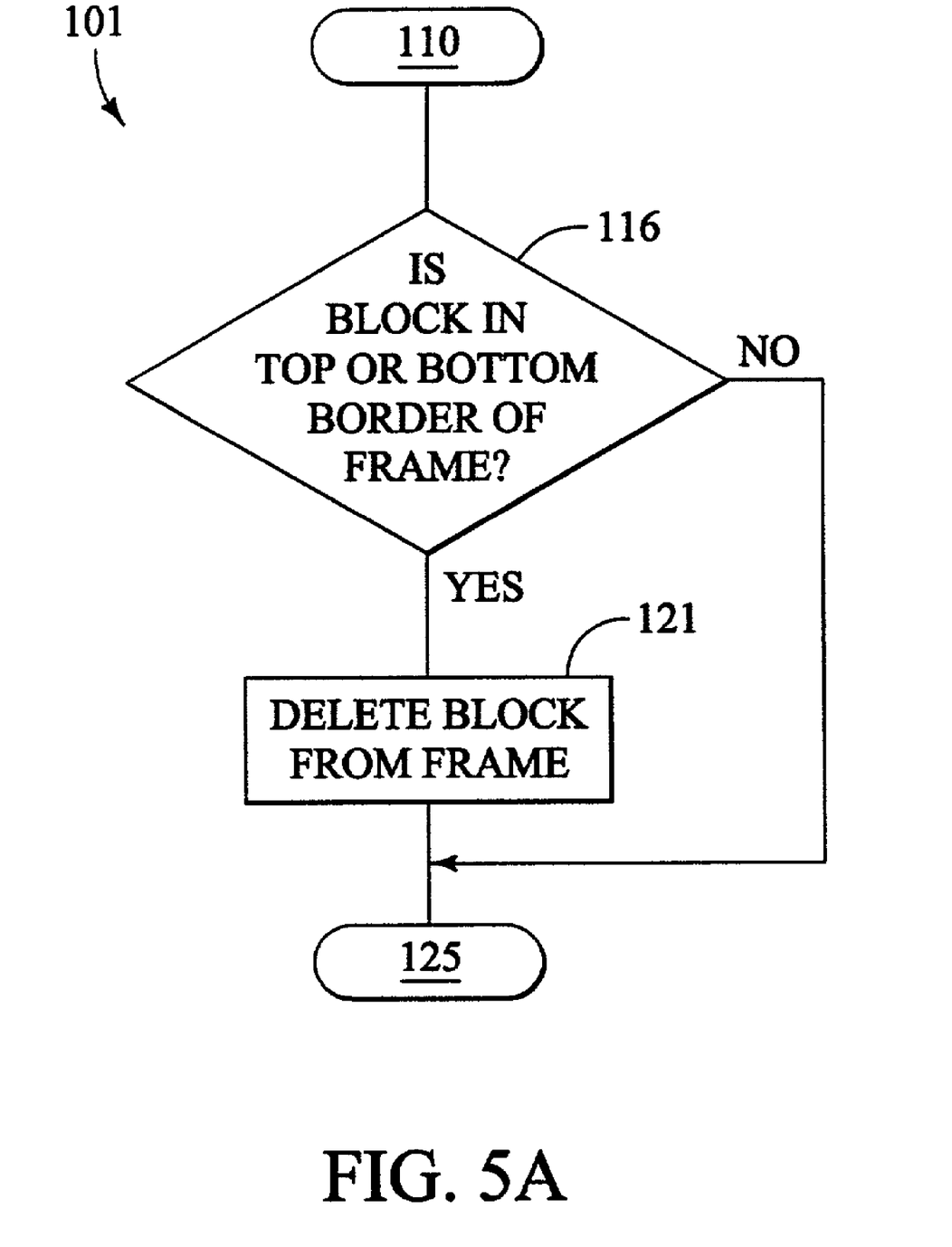
FIGS. 5A, 5B, and 5C are example flow diagrams showing additional detail to the process illustrated in FIG. 3.
Figure 5B:
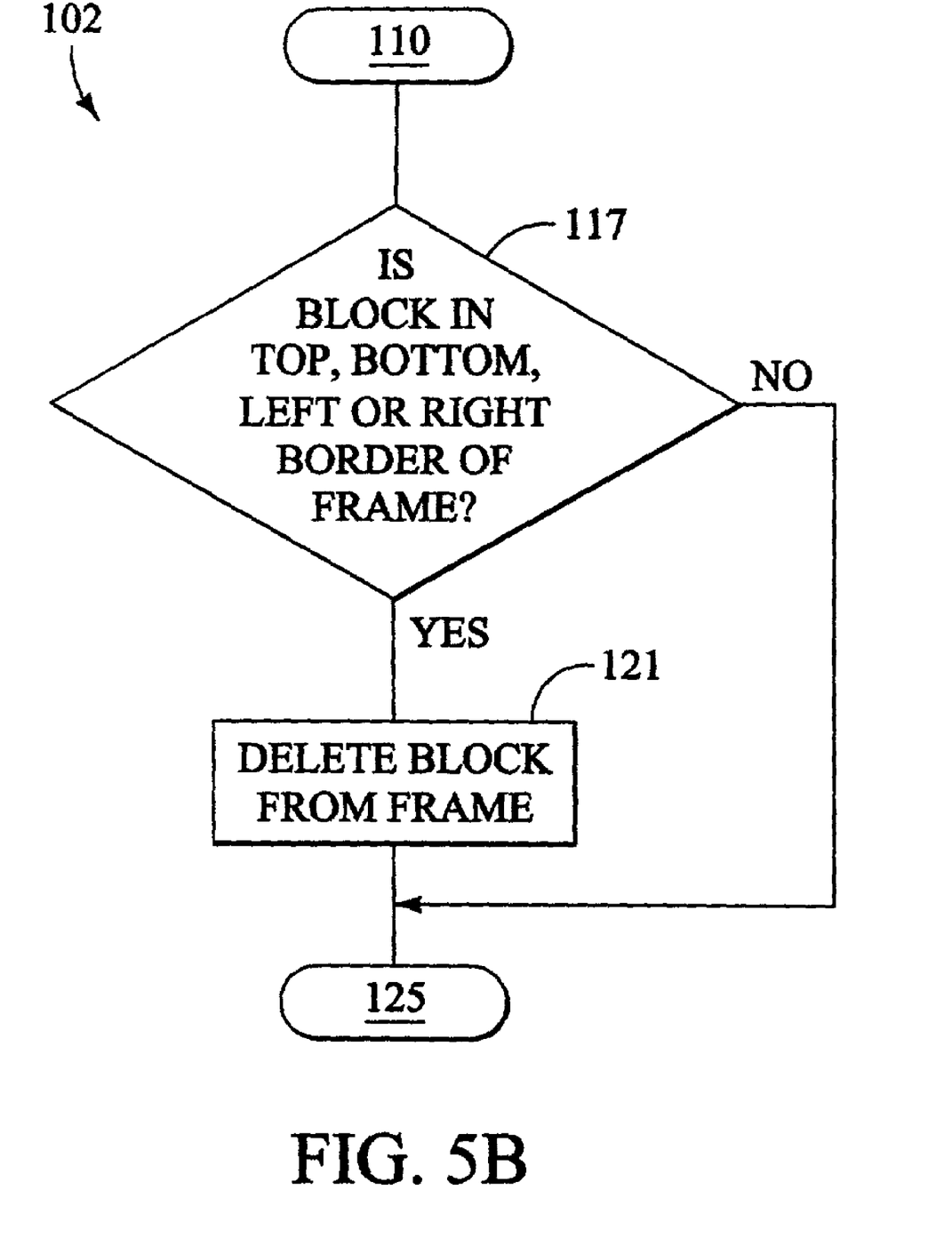

FIGS. 5A and 5B show additional detail of flows for particular implementations of the frame modifier 16. In a flow 101 of FIG. 5A, a check 116 is substituted for the check 115 of FIG. 3 in that the block is analyzed to determine only if it is in the top or the bottom of the overscan region 13. If so, the block is deleted from the frame in a process 121. In the implementation illustrated in flow 102 of FIG. 5B, the block is checked in a process 117 to determine if it is in either the top, bottom, or left or right margins of the overscan region 13 of the current frame. Again, if the block is in such a margin, it is deleted in the process 121. The remainder of the flows 101 and 102 (FIGS. 5A and 5B respectively), are the same as in the flow 100 of FIG. 3.

One advantage in an embodiment such as explained with reference to FIGS. 5A and 5B is that no modifications are necessary to the video encoder 20 or the video decoder 40 from a standard PVR system. This is because, in such systems, the video encoder 20 will simply encode all of the data that is passed to it, and the video decoder 40 will likewise decode all of the data. In this embodiment, without further modification, the actual size of the final image displayed on the TV or monitor 60 (FIG. 1) may be smaller than it would be if the overscan region 13 were not deleted. However, if the frame modifier 16 only deletes a small overscan region 13, then the displayed image may actually still be within the original borders of what is shown on the monitor 60, which automatically crops 5% to 10% of all images it receives. Another solution is to cause the rendering device 50 to "zoom" or slightly enlarge the displayed frame so that it takes up the entire standard viewing area on the monitor 60.

Returning back to FIG. 1, other embodiments of the inventive PVR system 5 can include an overscan encoder 21 within the video encoder 20. Similarly, an overscan decoder 41 can be included in the video decoder 40. The overscan encoder 21 can work independently or can work together with the overscan decoder 41 to minimize the amount of work performed by the video encoder 20 and decoder 40, as discussed below.

Figure 5C:
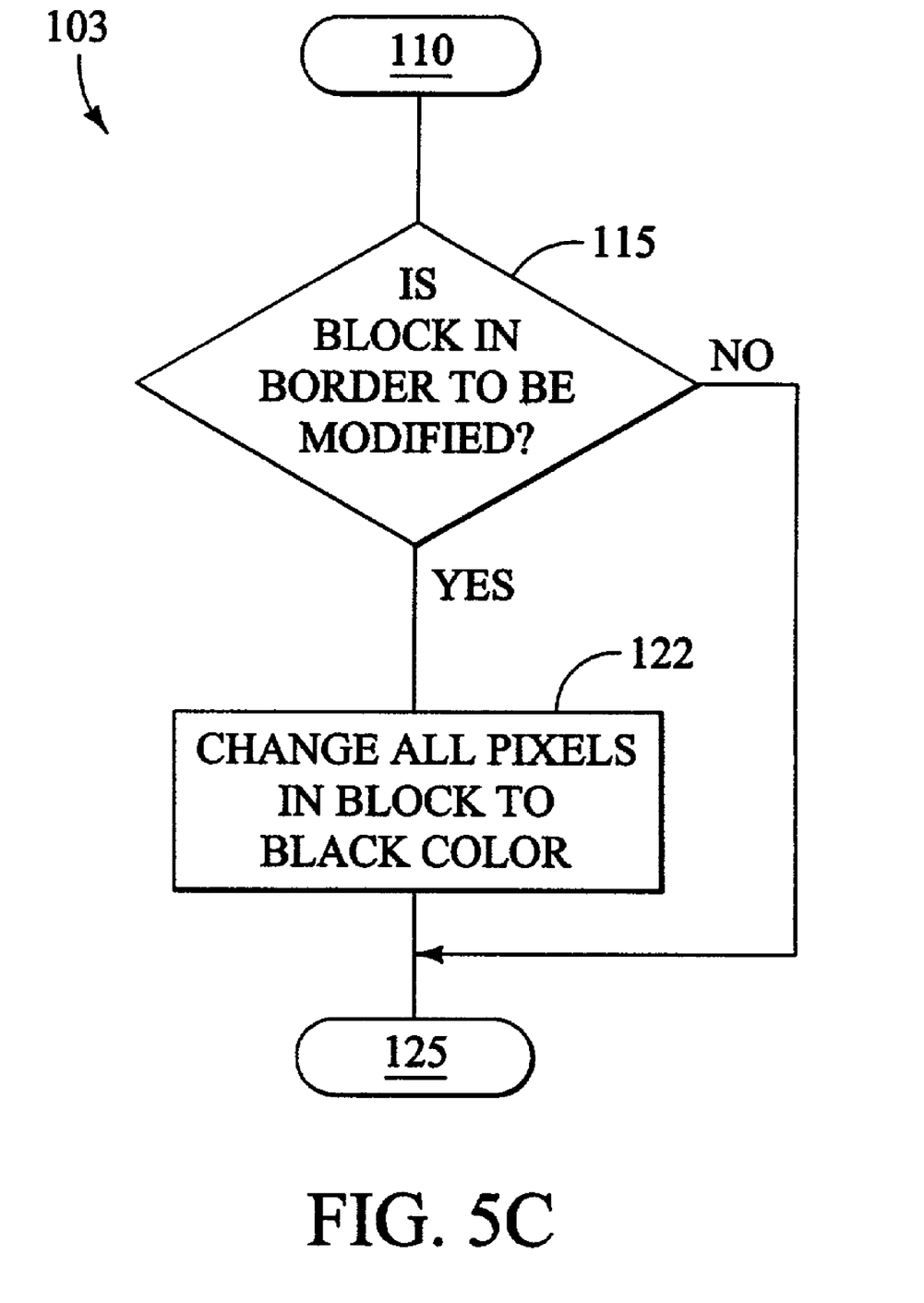

In one embodiment, the overscan encoder 21 can operate in a fashion similar to that of the frame modifier 16. In that embodiment, the overscan encoder 21 modifies the data in the blocks making up the overscan region 13 of the frame 8, for instance, by changing the color of all of the pixels in the current block to black. Because all of the pixels in the blocks are then the same color, they can be compressed to a great degree by the video encoder 20. A flow 103 showing this embodiment is illustrated in FIG. 4C. In that flow, if the check 115 determines that the current block is to be modified, e.g., is in the overscan portion 13 of the current frame 8, then all of the pixels within that block are turned to black in a process 122.

Another possibility to minimize the coding effort of the encoder 20 is to modify data making up the blocks in the overscan region 13 such that the image frame 8 can be most easily coded by the video encoder. For example, the overscan encoder may scan the current image frame 8 and place data into the blocks of the overscan region 13 that can most easily be compressed, based on the contents of the blocks in the central image area 18 of the current image frame. In some encoders, the data that may make it the easiest for the video encoder 20 to encode may be a simply copy of the data on the outermost blocks of the central portion 18 to the overscan region 13. That way the video encoder 20 could just make a simple notation that the entire block is repeated in the overscan regions. This embodiment may involve a large amount of pre-processing in order to make the actual video processing by the video encoder 20 easier. The data placed in the overscan area 13 in those embodiments of the invention would depend greatly on the way the video encoder 20 operates, and thus the actual data placed in the overscan area 13 is best determined when the video encoder 20 is implemented.

These embodiments where the data in the overscan region 13 is modified (using the overscan encoder 21) differ from the ones where the data in the overscan region is simply deleted (using the frame modifier 16), because in the latter examples using the overscan encoder 21, the video encoder 20 still encodes the overscan region 13. This distinction is highlighted by another embodiment of the video encoder 20 in the PVR system 5 of FIG. 1, which operates to simply not code the overscan regions 13, regardless of what data the blocks making up that region include. In this embodiment, the video encoder 20 ignores the data contained in the overscan region 13 when encoding the video data.

Yet other embodiments of the video encoder use a conjunction of the overscan encoder 21 and the overscan decoder 41 to determine the easiest way to minimize coding necessary to produce the central image area 18 of the frame 8. Such a system is possible because both the video encoder 20 and the video decoder 40 exist within the same system (the PVR system 5 of FIG. 1). In other applications for displaying video, such as a DVD player or a decoder that decodes streaming media, generally an encoder is completely separate from a decoder. For instance a DVD player typically includes only a decoder, while the encoder used to encode a DVD could be a special use encoder used to produce the DVD master.

These embodiments where the encoder 20 and decoder 40 cooperate may modify such parameters as motion vectors, in those encoders that use them. The motion vectors may be reduced for blocks in regions near or fully within the overscan region 13, while the motion vectors for the remainder of the image frame 8 are not reduced.

Additionally, many of the methods of reduced overscan coding can work cooperatively. For instance it may be beneficial to both change data in the overscan region 13 to black, and to modify the motion vectors in the encoder 20 in regions near the blacked-out edge, so that the encoder can operate more efficiently. In almost all of the methods described above, the renderer 50 can be adjusted to "zoom" the final display of the shown image such that no borders are visible in the displayed frame.

Using reduced overscan coding in PVR devices has advantages over present methods used in conventional PVRs. Because less data is being encoded, the storage device in the PVR can hold more data. This allows the PVR to record more hours of video, providing a desirable benefit to the user. Or, because it is encoding less data, or encoding data more efficiently, the PVR may be able to encode video from more than one source (such as multiple channels) simultaneously. Another advantage is that the encoder may be able to encode at a higher quality, using the same amount of data as is presently used.

Implementation of the PVR having reduced overscan coding is straightforward and intuitive once the details of the invention as described above are known. As always, implementation of the invention is left to the system designer. The circuits and processes may be implemented in any way, with any components as long as they can perform the necessary functions. Each of the processes may be integrated with others, or they may operate in a standalone manner. The individual processes described above were explained and shown with regard to their function, rather than to their physical implementation. The processes may operate in specific hardware, firmware, or could be software processes running on special or general purpose processors.

Thus, although particular embodiments for a PVR having reduced overscan coding have been discussed, it is not intended that such specific references be considered as limitations upon the scope of this invention, but rather the scope is determined by the following claims and their equivalents.

What is claimed is:

1. A digital recording system, comprising:
   an image data classifier having an input for accepting image data and structured to identify portions of the image data as being edge portions and non-edge portions including an overscan area, the overscan area including top, bottom, left, and right margins;
   an image data modifier coupled to the image data classifier and structured to modify the edge portions of the image data and create modified image data that includes the modified edge portions and the non-edge portions of the image data, the image data modifier including a frame modifier structured to delete substantially all of at least one of the top, bottom, left, and right margins of the overscan area;
   a video compressor coupled to the image data modifier and structured to compress the modified image data;
   a storage device coupled to the video compressor and structured to store the compressed image data; and
   an image renderer coupled to the storage device and structured to generate a re-created image signal from the compressed image data.

2. The digital recording system of claim 1, wherein the image data modifier is structured to delete at least some of the edge portions of the image data and to omit compression of substantially all of the deleted edge portions.

3. The digital recording system of claim 1 wherein the image data modifier is structured to copy some of the non-edge portions of the image data to at least some of the edge portions of the image data.

4. The digital recording system of claim 1 wherein the image renderer is structured to enlarge the re-created image signal.

5. A digital recording system, comprising:
   an image data classifier adapted to accept image data and structured to identify an overscan area and a viewing area, the overscan area including top, bottom, left, and right margins;
   a frame modifier structured to delete substantially all of at least one of the top, bottom, left, and right margins of the overscan area;
   a video compressor coupled to the image data classifier and structured to compress at least some of the image data;
   a storage device coupled to the video compressor and structured to store the compressed image data; and
   an image renderer coupled to the storage device and structured to generate a re-created image signal from the compressed image data.

6. The digital recording system of claim 5 wherein the video compressor is structured to compress substantially all of the image data of the viewing area, and to compress substantially none of the image data of the overscan area.

7. The digital recording system of claim 5 wherein the video compressor is an MPEG encoder.

8. A personal video recorder, comprising:
   an audio/video data classifier structured to accept image data and classify the image data as being central image data or overscan image data, the overscan image data including top, bottom, left, and right margins;
   a frame modifier structured to delete substantially all of at least one of the top, bottom, left, and right margins of the overscan image data;
   a video encoder coupled to the data classifier and structured to encode the central image data;
   a storage device coupled to the video encoder and structured to store the encoded image data; and
   an image renderer coupled to the storage device and structured to generate a re-created image from the encoded image data.

9. The personal video recorder of claim 8, wherein the video encoder is structured to encode substantially all of the central image data, and to encode substantially none of the overscan image data.

10. The personal video recorder of claim 8, wherein the central image data is substantially proportional to the image data.

11. The personal video recorder of claim 8, wherein the overscan modifier is structured to delete substantially all of top and bottom portions of the overscan image data.

12. The personal video recorder of claim 8 wherein the video encoder comprises a process running on a processor.

13. The personal video recorder of claim 8 wherein the image renderer is structured to enlarge a size of the re-created image.

14. The personal video recorder of claim 8 wherein the image renderer is structured to add data originating other than from the encoded image data to the re-created image.

15. The personal video recorder of claim 8 wherein the re-created image contains image and non-image data.

16. A method of operating a personal video recording device, the method comprising:
   accepting video data;
   classifying portions of the video data as being in a central area or as being in an edge area including an overscan area, the overscan area including top, bottom, left, and right margins;
   deleting substantially all of at least one of the top, bottom, left, and right margins of the overscan area;
   encoding the central area video data;
   storing the encoded video data on a storage device;
   retrieving the stored video data from the storage device; and
   rendering a video signal from the retrieved video data.

17. The method of claim 16, further comprising copying data from the central area to the edge data.

18. The method of claim 17, further comprising encoding the edge area video data.

19. The method of claim 16 wherein rendering a video signal from the retrieved video data comprises sizing the video signal to fit a display window.

20. The method of claim 16 wherein substantially all of the central area video data is encoded, and substantially none of the edge area data is encoded.

21. A computer-readable medium encoded with instructions capable of being executed by a computer, that, when executed, results in a machine:
accepting video data;
classifying portions of the video data as being in a central area or as being in an edge area including an overscan area, the overscan area including top, bottom, left, and right margins;
deleting substantially all of at least one of the top, bottom, left, and right margins of the overscan area;
encoding the central area video data;
storing the encoded video data on a storage device;
retrieving the stored video data from the storage device; and
rendering a video signal from the retrieved video data.

22. A digital recording system, comprising:
a frame modifier configured to accept input image data, and to classify each of a plurality of macroblocks as one of a central area and an overscan area, the overscan area including top, bottom, left, and right margins;
a video encoder configured to encode the macroblocks classified as the central area, and to not encode substantially all of the macroblocks classified as at least one of the top, bottom, left, and right margins of the overscan area;
a video decoder configured to create output image data from the macroblocks classified as the central area; and
a video renderer configured to adjust a size of the output image data.

23. The digital recording system of claim 22 wherein each of the plurality of macroblocks is comprised of a plurality of horizontal pixels and a plurality of vertical pixels.

24. The digital recording system of claim 23 wherein the video encoder is configured to size each of the plurality of macroblocks to fit substantially within one of the central area and the overscan area.

25. The digital recording system of claim 24 wherein the video renderer is configured to enlarge the output image data to cover an entire viewing area of a monitor.

26. A digital recording system, comprising:
a frame modifier configured to accept input image data, and to classify each of a plurality of macroblocks as one of a central area and an overscan area, the overscan area including top, bottom, left, and right margins;
a video encoder configured to copy at least one of the plurality of macroblocks from the central area to the overscan area, and to delete substantially all of the macroblocks classified as at least one of the top, bottom, left, and right margins of the overscan area;
a video decoder configured to create output image data from the macroblocks classified as the central area and from the macroblocks classified as the overscan area; and
a video renderer configured to adjust a size of the output image data.

27. The digital recording system of claim 26 wherein each of the plurality of macroblocks is comprised of a plurality of horizontal pixels and a plurality of vertical pixels.

28. The digital recording system of claim 27 wherein the video encoder is configured to replace substantially every macroblock from the overscan area with at least one macroblock from the central area.

29. The digital recording system of claim 28 wherein the video encoder is configured to make a notation that a replaced macroblock from the overscan area is a repeat of the at least one macroblock from the central area.

30. The digital recording system of claim 29 wherein the video encoder is configured to size each of the plurality of macroblocks to fit substantially within one of the central area and the overscan area.

31. The digital recording system of claim 30 wherein the video renderer is configured to enlarge the output image data to cover an entire viewing area of a monitor and to prevent the macroblocks from the overscan area from being displayed to the viewing area of the monitor.

32. The digital recording system of claim 26, wherein the video encoder is configured to use a reduced set of motion vectors for the overscan area of the image data, and to use a non-reduced set of motion vectors for the viewing area of the image data.

* * * * *